UNITED STATES PATENT OFFICE 2,534,245

8-HALOXANTHINE SALTS OF 3'-DIALKYL-AMINOMETHYL - 4, 5, 6 - TRIHYDROXY-BENZO- (1,2) -FURAN-1'- (3') -ONES

John W. Cusic, Skokie, Ill., assignor to G. D. Searle & Co., Chicago, Ill., a corporation of Illinois No Drawing. Application November 30, 1949, Serial No. 130,371

5 Claims. (Cl. 260—253)

This invention relates to haloxanthine salts of organic bases of the following general structural formula

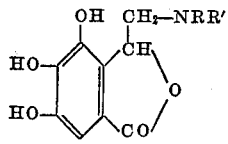

wherein R and R' are lower alkyl radicals. This invention also relates to methods of preparing such compounds. In the foregoing structural formula R and R' represent the same or different lower alkyl radicals and include methyl, ethyl, propyl, butyl, isobutyl and the like This application is a continuation-in-part of my prior application Serial No. 71,763, filed January 19, 1949.

It is recognized that organic bases of the foregoing structural formula, which are widely used as antihistaminic drugs, elicit certain undesirable side reactions and toxic manifestations, the most common of which are drowsiness and dizziness. The organic bases to which this invention pertains are disclosed in Reissue Patent No. 22,264, granted February 9, 1943. It is the object of this invention to produce new therapeutic substances which are relatively free from such untoward reactions. Another object is to produce salts of antihistaminic agents and haloxanthines which have reduced toxicity. A further object is to produce such salts having enhanced therapeutic efficacy. Other objects will be apparent to those skilled in the art in view of the disclosure given herein.

I have discovered that salts of organic bases of the foregoing formula with haloxanthines produce little effect on the central nervous system and appear to be more useful therapeutically than any of the individual components alone. Such salts exert a potentiating effect and show enhanced activity in combatting the effects of histamine. They are particularly useful in the treatment of anaphylaxis and allergic disorders. Certain of the salts within the scope of this invention are so free from undesirable side effects that they may be used in the treatment and prevention of motion sickness.

Among the halogenated xanthines to which this invention pertains are the chloro, bromo, and iodo derivatives of theophylline and related xanthines which have a hydrogen atom in position 7.

In particular this invention is concerned with acidic xanthines such as 8-chlorotheophylline
8-bromotheophylline
8-chloroxanthine
3-methyl-8-chloroxanthine
8-bromoxanthine
3-methyl-8-bromoxanthine
1,3-diethyl-8-bromoxanthine
1,3-diethyl-8-chloroxanthine
8-iodotheophylline
8-iodo-1,3-diethylxanthine Compositions of organic bases and haloxanthines are readily prepared by dissolving the base in a suitable solvent and treating the resulting solution with a solution of a halogenated xanthine. Solvents which are satisfactory for this reaction include the lower alcohols and ketones and their mixtures with water, ethers and hydrocarbons. Generally small excesses of the organic bases are desirable in these synthetic procedures. The desired salt generally crystallizes out of the solution on chilling or standing, or may be precipitated by addition of a solvent such as ether or benzene. A simple and efficient alternative method is that of heating together at 50–100° C. equivalent amounts of the liquid organic base and of the haloxanthine, with good mixing with a small amount of water or alcohol. As the materials react the mixture generally forms a thick paste or granular solid. On chilling the product becomes hard and solid and may be broken up, ground to a powder and dried. The compounds of this invention can also be produced by refluxing a solution of an ammonium salt of a haloxanthine in a lower alcohol or ketone with an equivalent of the organic base. During the heating, ammonia is evolved and the haloxanthine salt of the organic base is formed. On chilling this salt precipitates.

The following examples illustrate in more detail my invention, but in no way are to be construed as limiting it in spirit or in scope.

*Example 1*

16 g. of 3'-di-n-butylaminomethyl-4,5,6-trihydroxybenzo-(1,2)-furan-1'-(3')-one which has the formula

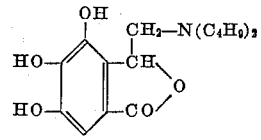

and which is also named 3-(di-n-butyl)aminomethyl-4,5,6-trihydroxyphthalide, and 10 g. of 8-chlorotheophylline are dissolved in a boiling mixture of 100 cc. of methyl ethyl ketone, 50 cc. of ethanol, and 60 cc. of water. The hot solution is filtered and evaporated to dryness. An amorphous residue of the 8-chlorotheophylline salt of 3'-di-n-butylaminomethyl-4,5,6-trihydroxybenzo-(1,2)-furan-1'-(3')-one is obtained. A sample of this product on analysis showed 12.74% nitrogen and 6.46% chlorine. The calculated values are respectively 12.71% and 6.44%.

*Example 2*

The 8-bromotheophylline salt of 3'-di-n-butylaminomethyl-4,5,6 - trihydroxybenzo - (1,2) - furan-1'-(3')-one is produced as in Example 1 from 8 g. of the base and 6 g. of bromotheophylline in 60 cc. of methyl ethyl ketone, 30 cc. of alcohol and 25 cc. of water. The salt is isolated by evaporation, trituration with ether and drying. A sample on analysis showed 14.22% bromine. The calculated value is 14.03%.

I claim:
1. A salt of an organic base of the formula

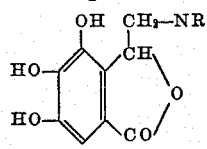

wherein R and R' are lower alkyl radicals, with an 8-haloxanthine which has a hydrogen atom in position 7.

2. A salt of an organic base as in claim 1 with an 8-halotheophylline.

3. A salt of an organic base of the formula

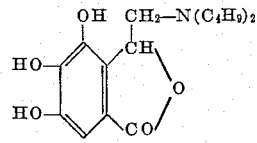

with an 8-halotheophylline.

4. The salt of an organic base as in claim 3 with 8-chlorotheophylline.

5. The salt of an organic base as in claim 3 with 8-bromotheophylline.

JOHN W. CUSIC.

No references cited.